(12) United States Patent
Olander et al.

(10) Patent No.: US 11,135,728 B2
(45) Date of Patent: Oct. 5, 2021

(54) LID ASSEMBLY FOR PORTABLE BIOCHAR KILN

(71) Applicant: BIOCHAR NOW, LLC, Loveland, CO (US)

(72) Inventors: Mikel Olander, Johnstown, CO (US); Perry Pierce, II, Fort Collins, CO (US); William T. Beierwaltes, Loveland, CO (US); James G. Gaspard, II, Loveland, CO (US)

(73) Assignee: Biochar Now, LLC, Loveland, CO (US)

( * ) Notice: Subject to any disclaimer, the term of this patent is extended or adjusted under 35 U.S.C. 154(b) by 13 days.

(21) Appl. No.: 16/684,997

(22) Filed: Nov. 15, 2019

(65) Prior Publication Data

US 2020/0078956 A1  Mar. 12, 2020

Related U.S. Application Data

(63) Continuation of application No. 16/149,789, filed on Oct. 2, 2018, now Pat. No. 10,751,885, which is a
(Continued)

(51) Int. Cl.
*C10B 53/02* (2006.01)
*C10B 1/04* (2006.01)
(Continued)

(52) U.S. Cl.
CPC ............... *B25J 15/00* (2013.01); *B66C 1/10* (2013.01); *B66C 1/101* (2013.01); *B66C 1/427* (2013.01);
(Continued)

(58) Field of Classification Search
CPC ......... C10B 47/02; C10B 47/04; C10B 47/06; C10B 53/02; C10B 1/02; C10B 1/04;
(Continued)

(56) References Cited

U.S. PATENT DOCUMENTS

| 414,938 | A | * | 11/1889 | Burcey | .................. C10B 47/06 202/105 |
| 617,646 | A | * | 1/1899 | Egner | ....................... C10B 1/04 202/85 |

(Continued)

FOREIGN PATENT DOCUMENTS

| JP | 02052919 | 2/1990 |
| JP | 4267968 | 5/2009 |

(Continued)

OTHER PUBLICATIONS

International Search Report and the Written Opinion for app. No. PCT/US2016/015943 dated Jun. 9, 2016, 12 pgs.
(Continued)

*Primary Examiner* — Jonathan Luke Pilcher
(74) *Attorney, Agent, or Firm* — Trenner Law Firm, LLC; Mark D. Trenner

(57) ABSTRACT

A lid assembly for a portable biochar kiln and system is disclosed. An example of a lid assembly includes a cylindrical sidewall, a rim around the cylindrical sidewall, and a top portion having an opening formed therein. A removable stack is configured to fit over the opening formed in the top portion to direct exhaust from the portable biochar kiln. A gasket cover is interchangeable with the removable stack to fit over the opening formed in the top portion to form a substantially airtight seal over the opening formed in the top portion when a burn is complete in the portable biochar kiln to self-extinguish embers in the portable biochar kiln.

18 Claims, 12 Drawing Sheets

Related U.S. Application Data continuation-in-part of application No. 14/378,357, filed as application No. PCT/US2013/025999 on Feb. 13, 2013, now Pat. No. 10,370,593, and a continuation-in-part of application No. 15/453,601, filed on Mar. 8, 2017, now Pat. No. 10,385,274.

(60) Provisional application No. 61/599,906, filed on Feb. 16, 2012, provisional application No. 61/599,910, filed on Feb. 16, 2012, provisional application No. 61/604,469, filed on Feb. 28, 2012, provisional application No. 62/317,573, filed on Apr. 3, 2016.

(51) Int. Cl.
| | |
|---|---|
| B25J 15/00 | (2006.01) |
| C10B 25/22 | (2006.01) |
| C10B 25/14 | (2006.01) |
| B66C 1/42 | (2006.01) |
| B66C 1/10 | (2006.01) |
| B66C 1/62 | (2006.01) |
| B66F 9/18 | (2006.01) |
| C10B 1/02 | (2006.01) |

(52) U.S. Cl.
CPC .............. *B66C 1/625* (2013.01); *B66F 9/183* (2013.01); *B66F 9/187* (2013.01); *C10B 1/04* (2013.01); *C10B 25/14* (2013.01); *C10B 25/22* (2013.01); *C10B 53/02* (2013.01); *C10B 1/02* (2013.01)

(58) Field of Classification Search
CPC ......... C10B 47/48; C10B 25/20; C10B 25/22; C10B 25/14; B66F 9/06; B66F 9/061; B66F 9/12; B66F 9/125; B66F 9/183; B66F 9/187; B66F 9/18; B66F 9/184; B66F 9/185; B66F 9/186; B66F 9/188; B66C 1/10; B66C 1/101; B66C 1/62; B66C 1/625; B65D 5/64; B65D 5/68; B65D 3/26

See application file for complete search history.

(56) References Cited

U.S. PATENT DOCUMENTS

| | | | |
|---|---|---|---|
| 917,531 A * | 4/1909 | Brown | C10B 1/04 |
| | | | 202/115 |
| 2,571,550 A | 10/1951 | Ehmann | |
| RE23,694 E | 8/1953 | Ehmann | |
| 2,739,009 A | 3/1956 | Phillips | |
| 2,819,113 A | 1/1958 | Phillips | |
| 2,847,369 A | 8/1958 | Hughes et al. | |
| 3,438,523 A | 4/1969 | Vik | |
| 3,500,812 A | 3/1970 | Korngold | |
| 3,512,670 A | 5/1970 | Howard | |
| 3,595,181 A | 7/1971 | Anderson | |
| 3,695,192 A | 10/1972 | Von Brimer | |
| 3,777,676 A | 12/1973 | Lagen | |
| 4,117,826 A | 10/1978 | Bette | |
| 4,167,909 A | 9/1979 | Dauvergne | |
| 4,249,883 A | 2/1981 | Woolfolk | |
| 4,256,081 A | 3/1981 | Stover | |
| 4,261,269 A | 4/1981 | Mallek et al. | |
| 4,263,890 A | 4/1981 | Turko et al. | |
| 4,276,871 A | 7/1981 | Lindveit | |
| 4,419,942 A | 12/1983 | Johnson | |
| 4,454,826 A | 6/1984 | Benedick | |
| 4,765,256 A | 8/1988 | Caughey | |
| 4,810,385 A | 3/1989 | Hater et al. | |
| 5,014,680 A | 5/1991 | Siemer | |
| 5,018,458 A | 5/1991 | McIntyre et al. | |
| 5,160,259 A | 11/1992 | O'Hara et al. | |
| 5,190,901 A | 3/1993 | Hirai | |
| 5,236,298 A | 8/1993 | Lehman | |
| 5,281,076 A | 1/1994 | Lehman | |
| 5,305,954 A | 4/1994 | Abel | |
| 5,499,622 A | 3/1996 | Woods | |
| 5,770,079 A | 6/1998 | Haase | |
| 5,799,590 A | 9/1998 | Noguchi | |
| 5,968,320 A | 10/1999 | Sprague | |
| 6,484,714 B1 | 11/2002 | Smith | |
| 6,655,304 B1 | 12/2003 | Barlow | |
| 6,790,317 B2 | 9/2004 | Antal, Jr. | |
| 7,241,322 B2 | 7/2007 | Graham | |
| 7,354,557 B2 | 4/2008 | Muramatsu | |
| 7,371,308 B1 | 5/2008 | Hacki | |
| 7,381,333 B1 | 6/2008 | Rainer | |
| 7,399,458 B1 | 7/2008 | Martin | |
| 7,458,809 B2 | 12/2008 | Hohenshelt et al. | |
| 7,678,176 B2 | 3/2010 | Whitten et al. | |
| 8,100,990 B2 | 1/2012 | Ellens et al. | |
| 8,287,728 B2 | 10/2012 | Kania et al. | |
| 8,361,186 B1 | 1/2013 | Shearer et al. | |
| 8,419,812 B2 | 4/2013 | Ershag | |
| 8,512,644 B1 | 8/2013 | Maganas | |
| 8,673,150 B2 | 3/2014 | Pearson | |
| 8,747,797 B2 | 6/2014 | Shearer et al. | |
| 8,812,162 B2 | 8/2014 | Schneider et al. | |
| 8,986,507 B2 | 3/2015 | Schottdorf | |
| 9,139,790 B2 | 9/2015 | Taniguro et al. | |
| 9,321,966 B2 | 4/2016 | Wang | |
| 9,725,371 B2 | 8/2017 | Shearer et al. | |
| 9,752,078 B2 | 9/2017 | Aupperle et al. | |
| 9,878,301 B1 | 1/2018 | Kinsman et al. | |
| 9,878,924 B2 | 1/2018 | Beierwaltes et al. | |
| 9,975,792 B2 | 5/2018 | Thorgersen et al. | |
| 10,160,911 B2 | 12/2018 | Aupperle et al. | |
| 10,253,979 B2 | 4/2019 | Aupperle et al. | |
| 10,323,845 B2 | 6/2019 | Aupperle et al. | |
| 10,370,593 B2 | 8/2019 | Aupperle et al. | |
| 10,385,273 B2 | 8/2019 | Olander et al. | |
| 10,385,274 B2 | 8/2019 | Olander et al. | |
| 10,527,282 B2 | 1/2020 | Aupperle et al. | |
| 2003/0024165 A1 | 2/2003 | Antal, Jr. | |
| 2003/0034286 A1 | 2/2003 | Butler | |
| 2003/0136734 A1 | 7/2003 | Mirzayi et al. | |
| 2004/0178052 A1 | 9/2004 | Antal, Jr. | |
| 2005/0051918 A1 | 3/2005 | Muramatsu | |
| 2008/0141997 A1 | 6/2008 | Druin | |
| 2008/0223269 A1 | 9/2008 | Paoluccio | |
| 2009/0199747 A1 | 8/2009 | Laskowski et al. | |
| 2009/0211892 A1 | 8/2009 | Cunningham | |
| 2009/0215375 A1 | 8/2009 | Hagensen | |
| 2009/0269181 A1 | 10/2009 | Moffitt | |
| 2010/0031571 A1 | 2/2010 | Ershag | |
| 2010/0120128 A1 | 5/2010 | Liang | |
| 2011/0100272 A1 | 5/2011 | Hasselbring et al. | |
| 2011/0108018 A1 | 5/2011 | Heinsohn et al. | |
| 2011/0114144 A1 | 5/2011 | Green et al. | |
| 2011/0172092 A1 | 7/2011 | Lee et al. | |
| 2011/0252699 A1 | 10/2011 | Shepard | |
| 2012/0079762 A1 | 4/2012 | Schottdorf | |
| 2012/0116589 A1 | 5/2012 | Schneider et al. | |
| 2012/0193212 A1 | 8/2012 | Taniguro et al. | |
| 2012/0237994 A1 | 9/2012 | Das et al. | |
| 2012/0304718 A1 | 12/2012 | Cheiky et al. | |
| 2012/0305380 A1 | 12/2012 | Wang | |
| 2013/0068690 A1 | 3/2013 | McCord et al. | |
| 2013/0341175 A1 | 12/2013 | Linden et al. | |
| 2013/0341176 A1 | 12/2013 | Filho | |
| 2014/0151296 A1 | 6/2014 | Moore et al. | |
| 2014/0323297 A1 | 10/2014 | Harman et al. | |
| 2015/0040804 A1 | 2/2015 | Aupperle | |
| 2015/0136581 A1 | 5/2015 | Aupperle | |
| 2015/0144564 A1 | 5/2015 | Moller et al. | |
| 2015/0219341 A1 | 8/2015 | Yun | |
| 2015/0237813 A1 | 8/2015 | Field | |
| 2016/0229709 A1 | 2/2016 | Beierwaltes | |
| 2016/0075567 A1 | 3/2016 | Tour et al. | |
| 2016/0211041 A1 | 7/2016 | Maganas | |
| 2017/0055502 A1 | 3/2017 | Gagliano et al. | |
| 2017/0283703 A1 | 10/2017 | Olander et al. | |

(56) References Cited

U.S. PATENT DOCUMENTS

| | | |
|---|---|---|
| 2017/0283704 A1 | 10/2017 | Olander et al. |
| 2017/0369785 A1 | 12/2017 | Aupperle et al. |
| 2018/0072953 A1 | 3/2018 | Aupperle et al. |
| 2018/0072954 A1 | 3/2018 | Aupperle et al. |
| 2018/0105437 A1 | 4/2018 | Beiennaltes et al. |
| 2018/0282628 A1 | 10/2018 | Aupperle et al. |
| 2018/0282629 A1 | 10/2018 | Aupperle et al. |
| 2018/0282630 A1 | 10/2018 | Aupperle et al. |
| 2018/0327329 A1 | 11/2018 | Bontchev et al. |
| 2019/0030725 A1 | 1/2019 | Olander et al. |
| 2019/0330533 A1 | 10/2019 | Olander et al. |

FOREIGN PATENT DOCUMENTS

| | | |
|---|---|---|
| KR | 1020020010902 | 2/2002 |
| WO | WO 2006117006 | 11/2006 |
| WO | WO 2010122525 | 10/2010 |
| WO | WO 2010129996 | 11/2010 |
| WO | WO 2011097183 | 8/2011 |
| WO | WO 2011143718 | 11/2011 |
| WO | WO 2012061795 | 5/2012 |
| WO | WO 2013126477 | 8/2013 |
| WO | WO 2013152337 | 10/2013 |
| WO | WO 2013126477 | 4/2014 |
| WO | WO 2014179670 | 11/2014 |

OTHER PUBLICATIONS

International Search Report and the Written Opinion for app. No. PCT/US2013/025999 dated Jun. 12, 2013, 8 pgs.
International Search Report and the Written Opinion for app. No. PCT/US2013/030079 dated Jun. 18, 2013, 9 pgs.
English abstract for JP No. 4267968 dated May 27, 2009, 2 pgs.
International Preliminary Report on Patentability for International Application No. PCT/US2013/030079, dated Aug. 19, 2014, 5 pp.
International Preliminary Report on Patentability for International Application No. PCT/US2013/025999, dated Aug. 19, 2014, 5 pp.
Machine Translation of KR-10-2002-0010902, obtained from KIPRIS, Feb. 6, 2002, 83 pp.
International Preliminary Report on Patentability for International Application No. PCT/US2016/015943, dated Aug. 8, 2017, 7 pp.
Sugarman, Joe, "Is it Safe to Swim in the Chesapeake Bay?", Washingtonian Magazine, Jun. 28, 2016 (downloaded Dec. 31, 2018), 21 pages, Washington, D.C.
Greenyarn—Technology in Nature, www.greenyarn.com, Copyright 2005 (downloaded Dec. 31, 2018), 5 pages, Greenyarn LLC, Boston, Massachusetts.
www.reddit.com, "Are you supposed to wear underwear under swim trunks?", blog conversation dated 2015 (downloaded Dec. 31, 2018), 8 pages.
Schmidt, Hans-Peter, "Novel Uses of Biochar-a key technology for the future of the planet," downloaded from https://scholarworks.umass.edu/biochar/2013/Benefits/7/ (downloaded Dec. 31, 2018), 106 pages.
USEPA technical report "Toxic Contaminants in the Chesapeake by and Its Watershed; Extent and Severity of Occurrence and Potential Biological Effects," Technical Report Dec. 2012, p. 44-59, Annapolis, Maryland.
Yao, Ying, et al., "Effect of biochar amendment on sorption and leaching of nitrate, ammonium, and phosphate in a sandy soil," Chernosphere, 2012, pp. 1467-1471, vol. 89, Elsevier, Gainesville, Florida.
Wang, Zhanghong, et al. Biochar produced from oak sawdust by Lanthanum (La)-involved pyrolysis for adsorption of ammonium ($NH_4+$), nitrate ($NO_3-$), and phosphate ($PO_3/4-$), Chernosphere, 2015, pp. 646-653, vol. 119, ELSEVIER, China.
Simmons, "Charcoal from portable kilns and fixed installations", 1963, 19 pages, Unasylva—No. 71, vol. 17, Food and Agriculture Organization of the United Nation.
https://www.constructionequipment.com/company/jrb, "JRB", Accessed Oct. 31, 2019, 4 pages.
https://www.constructionequipment.com/jrb-multi-pick-coupler, "JR3 Multi Pick Coupler", Sep. 28, 2010, 8 pages.

* cited by examiner

LID ASSEMBLY FOR PORTABLE BIOCHAR KILN

CROSS REFERENCE AND PRIORITY CLAIM TO RELATED APPLICATIONS

This application claims the priority filing date and benefit as a continuation of U.S. patent application Ser. No. 16/149,789 for "Gripper Assembly For Portable Biochar Kiln" filed Oct. 2, 2018, which is a continuation-in-part of U.S. patent application Ser. No. 15/453,601 for "Portable Biochar Kiln" filed Mar. 8, 2017, which claims the priority benefit of U.S. Provisional Patent Application No. 62/317,573 filed Apr. 3, 2016 for "Biochar Kiln." This application claims the priority filing date and benefit as a continuation-in-part of U.S. patent application Ser. No. 14/378,357 for "Controlled Kiln and Manufacturing System For Biochar Production", filed Aug. 13, 2014, which is a national stage entry (371) of PCT Patent Application US2013/025999 filed Feb. 13, 2013, which claims the priority benefit of U.S. Provisional Patent Application No. 61/599,906 filed Feb. 16, 2012, U.S. Provisional Patent Application No. 61/599,910 filed Feb. 16, 2012, and Provisional Patent Application No. 61/604,469 filed on Feb. 28, 2012. Each of the above-referenced patent applications is hereby incorporated by reference in its entirety as though fully set forth herein.

BACKGROUND

Biochar is made from biomass (trees, agricultural waste, etc.) in an oxygen deprived, high temperature environment. Quality biochar has high purity, absorptivity and cation exchange capacity. This can provide significant benefits to several large markets including agriculture, pollution remediation, odor sequestration, separation of gases, oil and gas clean up, and more.

DETAILED DESCRIPTION

A biochar kiln and system is disclosed, including construction of the kiln and various subsystems such as, but not limited to, ventilation, stack, control, insulation, and ember suppression. The kiln may be implemented to produce biochar.

The biochar kiln is configured to support slow pyrolysis and can accommodate a number of variables. Variables include, but are not limited to, a "green" and/or dry feedstock, large and/or small pieces of the feedstock, various and multiple different species of the feedstock, and operation according to variable processing times. The biochar kiln is robust in that it may be operated under a number of variable operating conditions, while still producing a consistent and high quality biochar product.

An example portable biochar kiln includes a body having a one-piece rolled wall, a curved floor attached to a sidewall. The example portable biochar kiln also includes a ridge around an outside perimeter of the body. The ridge is configured for engagement with a gripper attachment for heavy machinery to raise and lower the body. The example portable biochar kiln also includes a removable lid. An edge is provided around an outside perimeter of the removable lid. The edge is configured for engagement with the same gripper attachment for heavy machinery to cover and uncover the lid on the body.

An example of a portable biochar kiln system includes a kiln body. A ridge is provided around an outside perimeter of the kiln body. A removable lid is provided to cover and uncover an opening in the top of the kiln body. An edge is provided around an outside perimeter of the removable lid. The example portable biochar kiln system also includes a gripper attachment for heavy machinery. The gripper attachment is configured for engagement with the ridge to raise and lower the kiln body. The gripper attachment is also configured for engagement with the edge of the lid to cover and uncover the kiln body.

In an example, the kiln has a removable lid to permit easy loading of feedstock and unloading of biochar. The kiln may also have removable stacks and a stack hole sealing mechanism. In an example, the kiln is transportable and can travel to workstations, instead of making the workstations travel to the kilns.

Before continuing, it is noted that as used herein, the terms "includes" and "including" mean, but is not limited to, "includes" or "including" and "includes at least" or "including at least." The term "based on" means "based on" and "based at least in part on."

Figure 1:
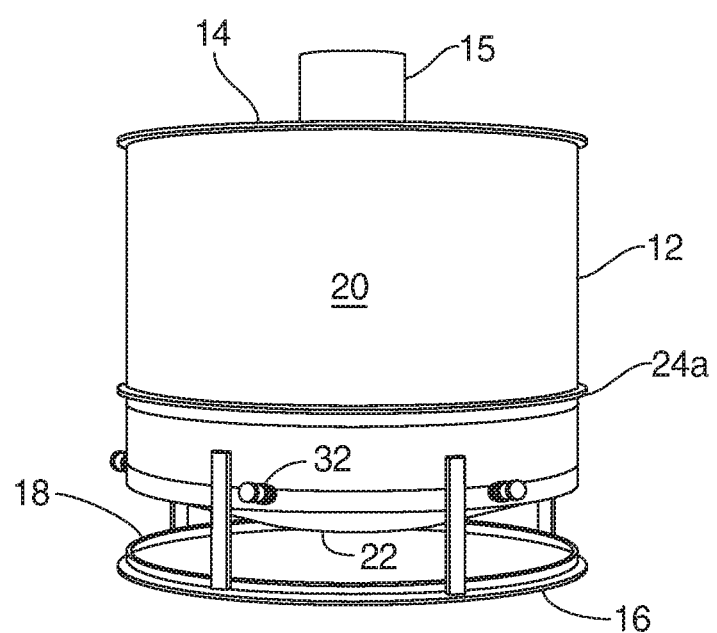
FIG. 1 is a perspective view of an example portable biochar kiln.

FIG. 1 is a perspective view of an example biochar kiln 10. The biochar kiln 10 may include a main body portion 12 and a lid 14. The main body portion 12 is configured to receive a feedstock (not shown) by removing the lid 14 and loading the feedstock before replacing the lid 14. In an example, the biochar kiln further includes a base portion 16. The base portion 16 may be configured such that it is raised off of the ground. This enables airflow under the main body portion 12. A ring 18 may also be implemented to lift the biochar kiln 10, e.g., using a loader tractor, forklift or other suitable machinery.

In an example, the kiln wall 20 may be made of a one-piece, rolled wall. Body welds, where needed (e.g., between the floor 222 and wall 20, and various ports), are made on curved surfaces to lower structural and thermal stress to those joints.

The floor 24 may also be a one-piece heavy gauge, high strength steel. The floor 24 may be downward elliptical-shaped (the shape being visible in FIG. 1 and FIG. 5) to withstand heavy falling wood chunks during filling. The surface of the floor 24 is curved and has only one weld joint along the perimeter where it joins with the wall 20. In an example where the kiln floor is curved or substantially elliptical shaped and cannot balance the kiln, a multi-legged stand 16 with circular base 18 may be attached (e.g., welded) to the kiln body 12, which travels with the kiln body 12 as it is being transported.

Before continuing, it should be noted that the examples described above are provided for purposes of illustration, and are not intended to be limiting. Other devices and/or device configurations may be utilized to carry out the operations described herein.

Figure 2:
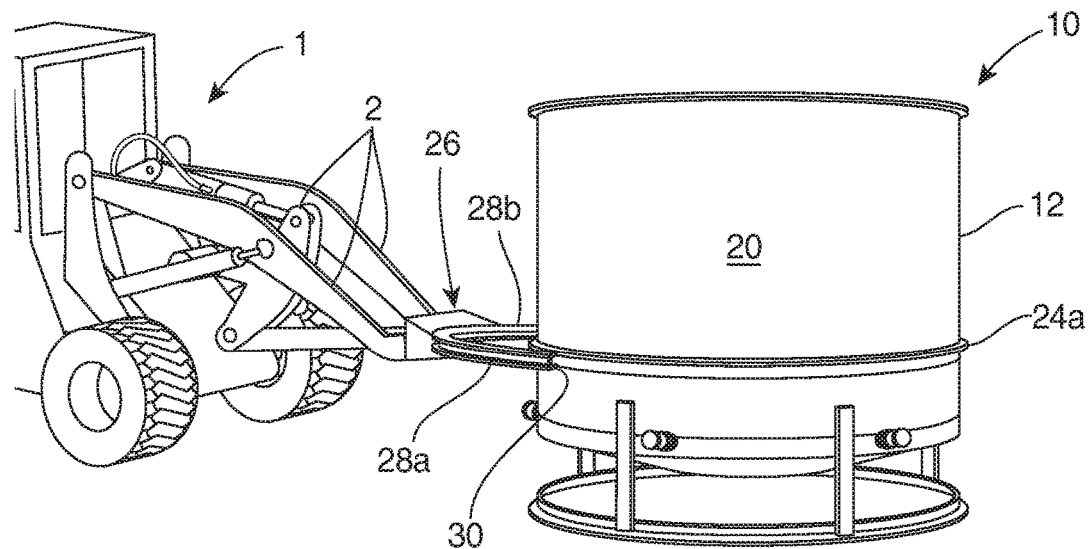
FIGS. 2-3 illustrate lifting and moving the example portable biochar kiln shown in FIG. 1.
Figure 3:
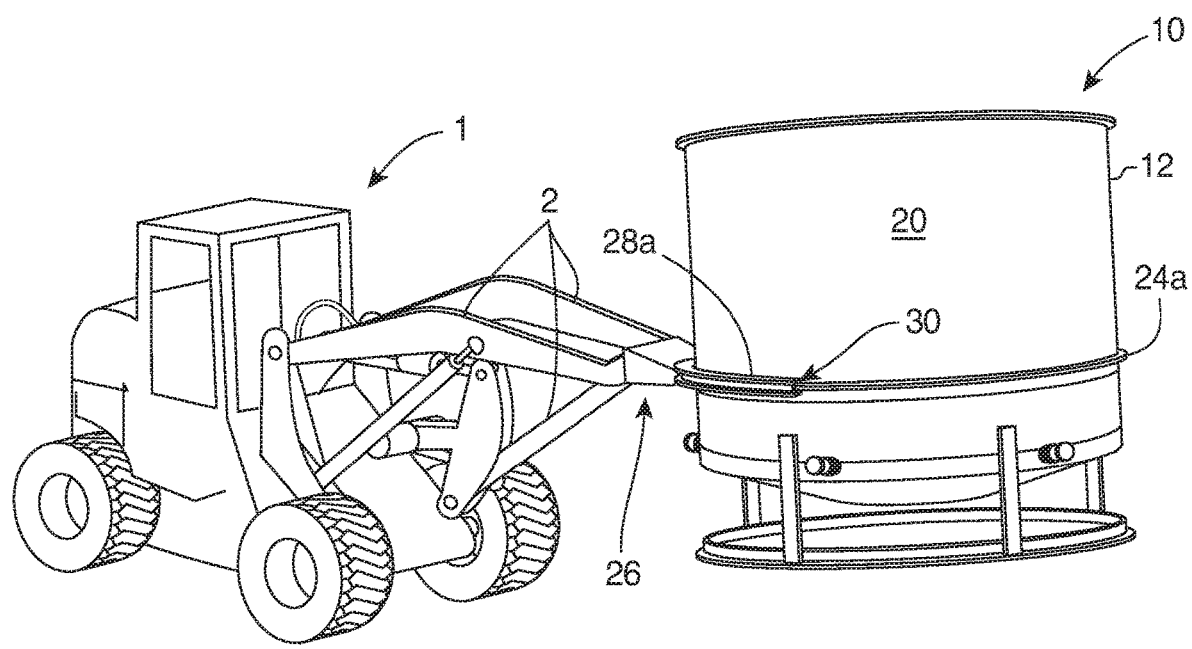

FIGS. 2-3 illustrate lifting and moving the example portable biochar kiln 10 shown in FIG. 1. The kiln body 12 may include a ridge. In an example, the ridge 24 may be provided as a heavy gauge, rolled gripper angle iron is provided on the outside perimeter of the body, e.g., around the walls 20. The ridge 24 may be substantially L-shaped, such that one leg of the L is mounted (e.g., welded or otherwise) to the wall 20 and the other leg of the L provides a lip. However, other configurations are also contemplated, such as a T-shape or other shape ridge that provides the lip around all or a portion of the perimeter of the wall 20.

This configuration enables structural durability, and the ridge 24 provides an interface for grasping with a heavy machinery arm. In an example, the heavy machinery may include a forklift. Other machinery (stationary or mobile) may also be provided to raise and lower the kiln, e.g., for transport.

In the example shown in FIGS. 2-3, a front-end loader 1 is implemented to raise and lower the kiln 10. The front-end loader 1 is shown as it may be specially configured with a gripper attachment 26.

The gripper attachment 26 may be attached to the front-end or "wheel" loader 1 where a bucket or other tooling may typically be installed, e.g., at the ends of arms 2. The gripper attaches to the wheel loader using a JRB style quick attach interface which is standard or a factory option on many brands of wheel loaders.

Movement of the arms 2 enables raising, lowering, and tilting of the gripper attachment 26, and as such, anything grasped by the gripper attachment 26, such as the kiln 10.

In an example, the gripper attachment 26 is configured as a pincher. That is, the gripper attachment has two arms 28a-b pivotally mounted to the gripper attachment such that the arms 28a-b can be opened (or loosened) and closed (or tightened).

In an example, a hydraulic rotor motor (not shown) is provided for the gripper attachment 26. The hydraulic rotor motor may be mounted to the gripper attachment 26, and wired into the cab of the front-end loader 1 so that it can be controlled by the operator/driver. The hydraulic rotor motor may be provided to open and close the arms 28a-b and/or rotate the arms 28a-b. As such, the hydraulic rotor motor may enable to the gripper attachment 26 to operate as a pincher. The hydraulic rotor motor may also enable a wheel loader to raise a kiln over a hopper and then dump its load (e.g., like a can of spaghetti into a saucepan). The dumping operation takes less than a minute during which the kiln remains attached to the wheel loader.

It is noted that the same hydraulic rotor motor may be implemented for both rotation and pincher operation, or a separate motor(s) can be provided.

During operation, the front-end loader 1 may approach the kiln 10 as shown in FIG. 2. The gripper attachment 26 may be raised off of the ground at about the same height as the ridge 24. As the front-end loader moves toward the kiln 10, a channel 30 formed in each of the arms 28a-b may be slid onto the ridge 24.

After positioning at the desired location, the arms 28a-b of the gripper attachment 26 may be closed against the ridge 24 to secure the kiln body 12 within the gripper attachment. It is noted that the structure of the ridge 24 may assist in preventing damage to the kiln wall 20, e.g., by providing additional support at the point(s) of engagement between the arms 28a-b and the kiln 10.

After engaging the arms 28a-b with the ridge 24, the arms 2 of the front-end loader 1 may be raised and/or tilted, depending on the desired operations, e.g., as shown in FIG. 3. As such, the front-end loader 1 may be used to transport the kiln 10 to any desired location. By tilting the gripper attachment 26, contents can be emptied from the kiln 10.

The process described above can be reversed to lower and release the kiln 10. This will be readily understood by those having ordinary skill in the art after becoming familiar with the teachings herein, and therefore a full description is not included.

Figure 4:
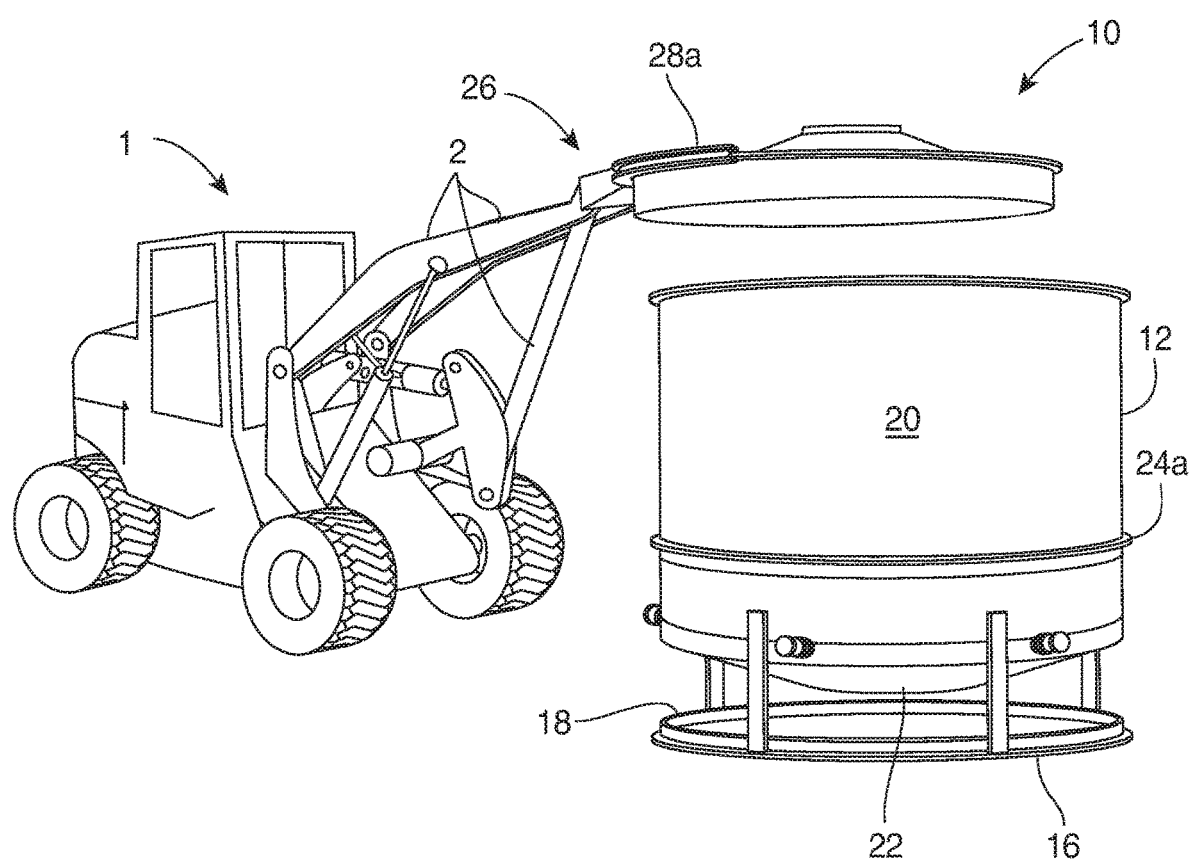
FIGS. 4-5 illustrate removing a lid from the example portable biochar kiln.
Figure 5:
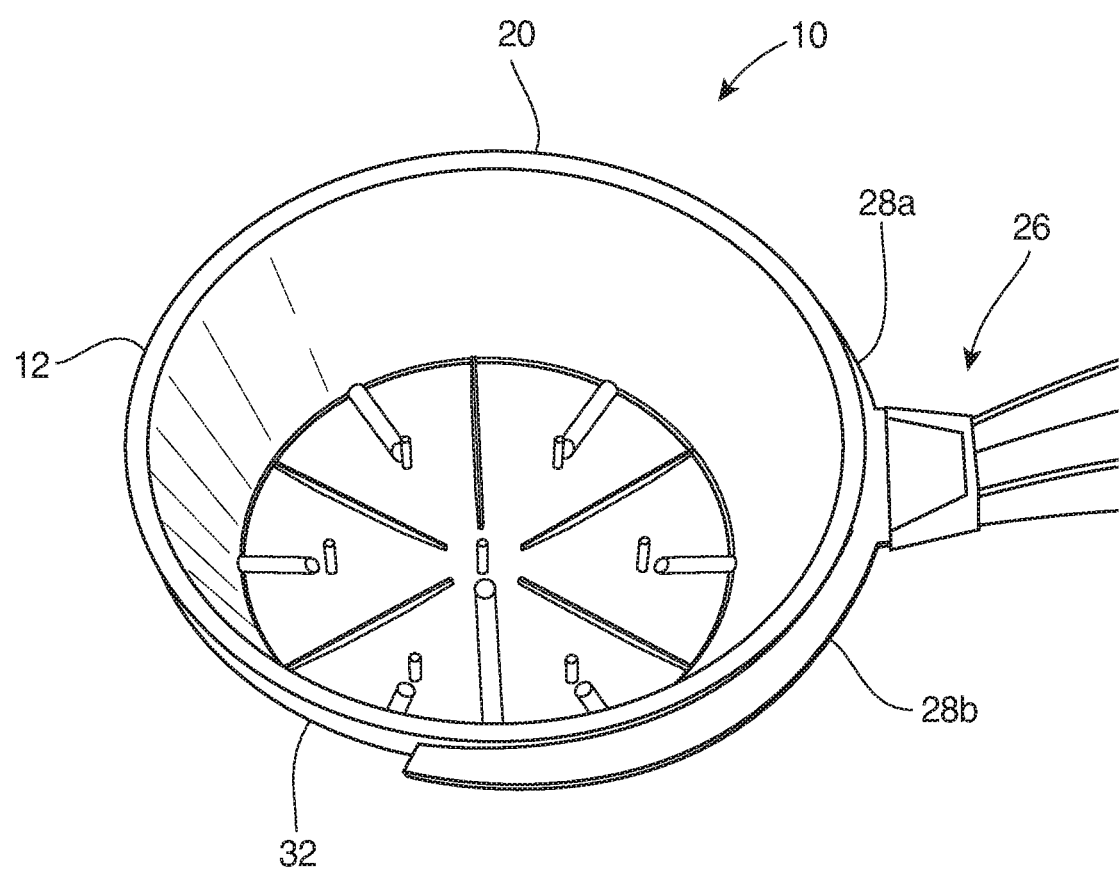

FIGS. 4-5 illustrate removing a lid from the example portable biochar kiln. The lid 14 of the kiln 10 may include an edge 32. In an example, the edge 32 may be provided as a heavy gauge, rolled gripper angle iron is provided on the outside perimeter of the lid 14. The edge 32 may be substantially L-shaped, such that one leg of the L is mounted (e.g., welded or otherwise) to the lid 14 and the other leg of the L provides a lip. However, other configurations are also contemplated, such as a T-shape or other shape ridge that provides the lip around all or a portion of the perimeter of the lid 14

This configuration enables structural durability, and the edge 32 provides an interface for grasping the lid 14 with a heavy machinery arm. As noted above, the heavy machinery may include a forklift or other machinery (stationary or mobile). In the example shown in FIGS. 4-5, the front-end loader 1 is implemented to raise and lower and thus attach and detach lid 14 from the kiln 10. The front-end loader 1 is shown as it may be specially configured with the same gripper attachment 26 described above for FIGS. 2-3.

During operation, the front-end loader 1 may approach the lid 14 of kiln 10. The gripper attachment 26 may be raised off of the ground at about the same height as the edge 32. As the front-end loader moves toward the kiln 10, a channel 30 formed in each of the arms 28a-b of the gripper attachment 26 may be slid onto the edge 32.

After positioning at the desired location, the arms 28a-b of the gripper attachment 26 may be closed against the edge 32 to secure the lid 14 within the gripper attachment. It is noted that the structure of the edge 32 may assist in preventing damage to the lid 14, e.g., by providing additional support at the point(s) of engagement between the arms 28a-b and the lid 14.

After engaging the arms 28a-b with the edge 32, the arms 2 of the front-end loader 1 may be raised and/or tilted, depending on the desired operations, e.g., as shown in FIG. 4. As such, the front-end loader 1 may be used to cover and uncover the kiln 10, and to transport the lid 14 to any desired location. FIG. 5 shows the inside of the kiln 10 after the lid has been removed. By tilting the gripper attachment 26, the ash, snow or debris can be removed from the lid 14.

Figure 6:
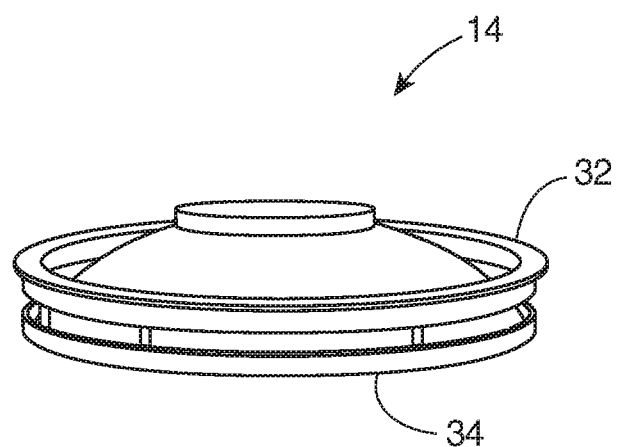
FIGS. 6-7 are perspective views of an example lid of the portable biochar kiln.
Figure 7:
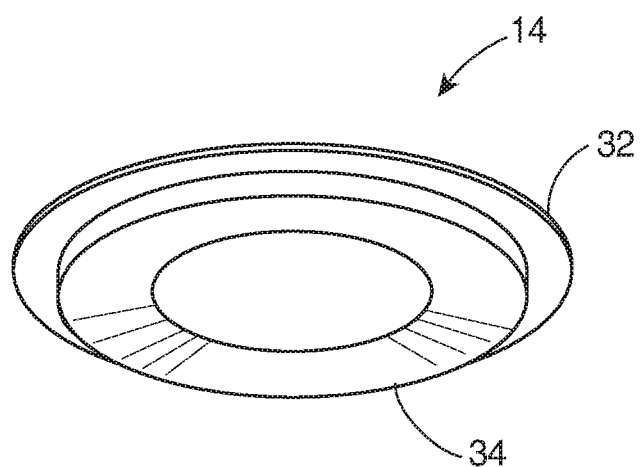

FIGS. 6-7 are perspective views of an example lid 14 of the portable biochar kiln 10, The lid 14 is shaped similar to the kiln floor 22. In an example, the lid 14 is a one-piece elliptical or curved heavy gauge, high strength steel. The lid 14 may anneal with use (e.g., it gets stronger over time).

In an example, a diameter of the edge 32 of the lid forms a lip which is about two inches greater than the outer perimeter of the kiln wall 20. As such the edge 32 of can sit on the kiln's top rim without falling in. In an example, the outer rim 34 of the lid 14 may seat within an inner perimeter of the kiln wall 20. In another example, the outer rim 34 may be larger than the kiln wall 20 such that the outer rim 34 sits on top of the kiln wall 20. A gasket (not shown) may be provided between the lid 14 and the kiln wall 20.

In an example, a circular, downward flange is installed under the lid to block condensed creosote from migrating to the lid's lip (it drips down onto the wood for reprocessing). If the creosote was allowed to migrate to the lip, it would make a hard, uneven interface with the seating angle iron. The resulting gaps would result in difficult to manage air leaks.

Figure 8:
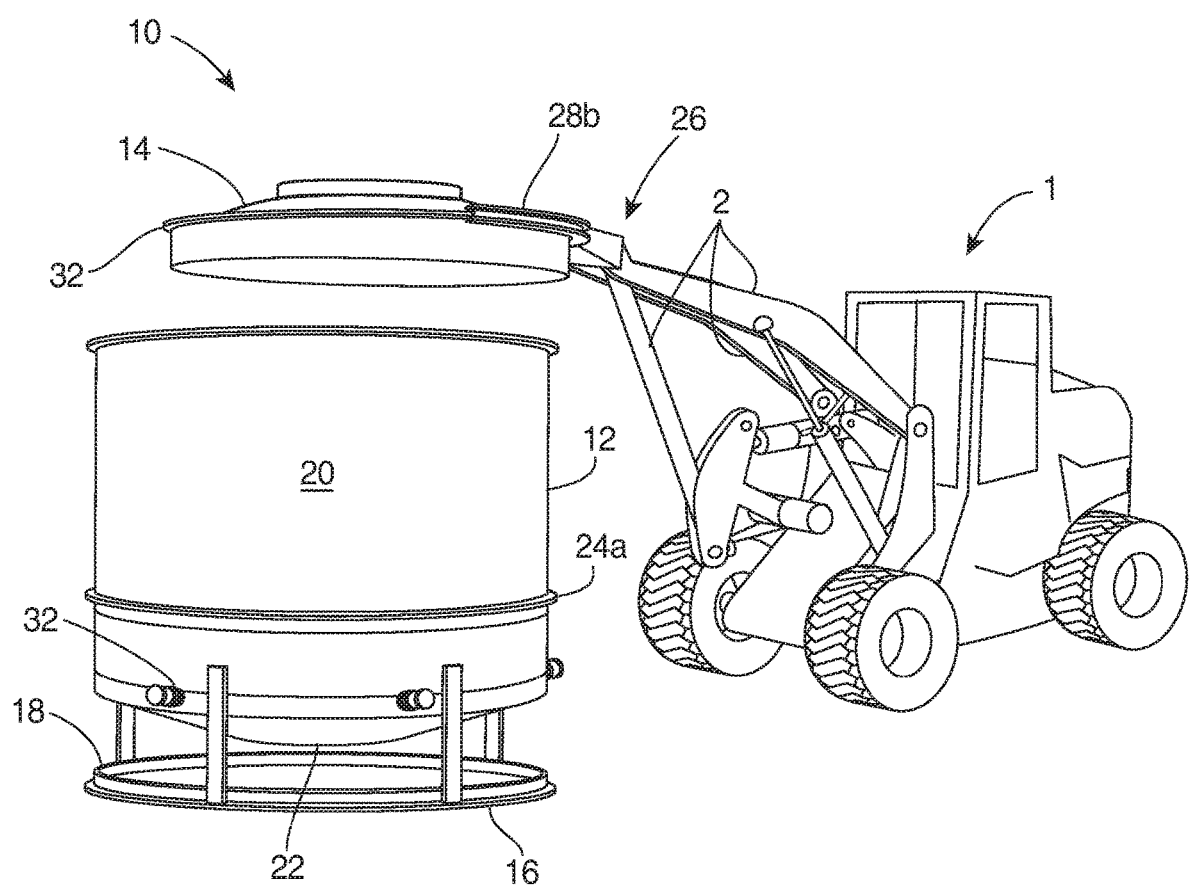
FIGS. 8-10 illustrate replacing the lid from the example portable biochar kiln.
Figure 9:
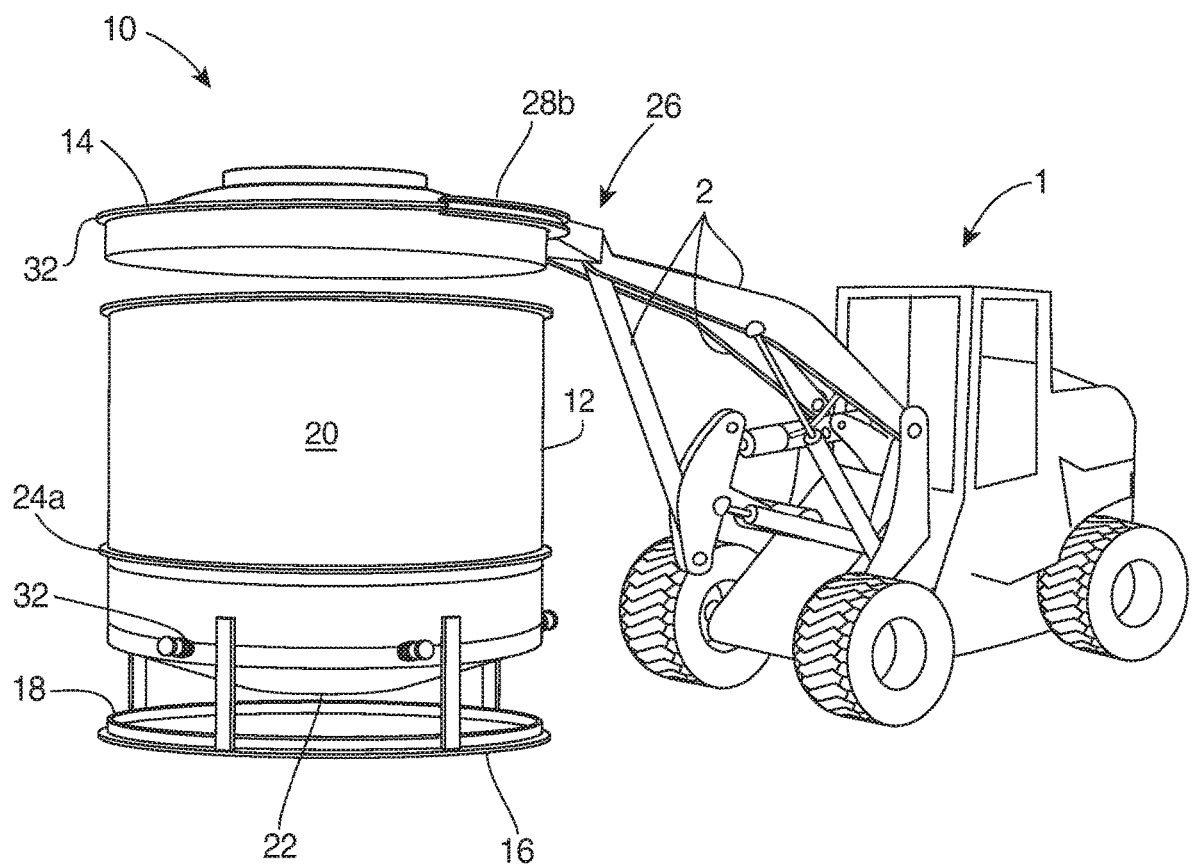
Figure 10:
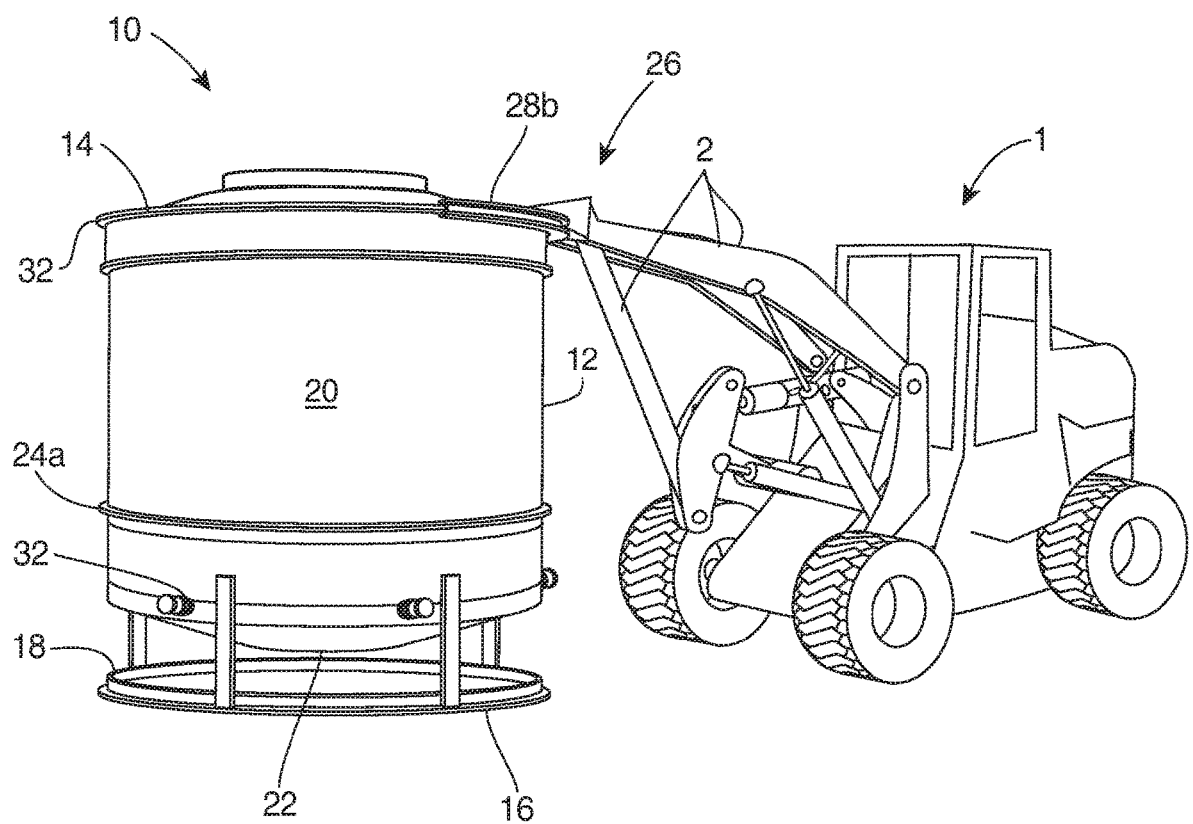

FIGS. 8-10 illustrate replacing the lid from the example portable biochar kiln. During operation, the front-end loader 1 carrying the lid 14, may approach the kiln 10 as shown in FIG. 8. The gripper attachment 26 may be raised off of the ground at about the same height or slightly higher than the top rim of the kiln 10. As the front-end loader moves toward the kiln 10.

After positioning at the desired location as shown in FIG. 9, the arms 28a-b of the gripper attachment 26 may lower the lid 14 onto the kiln 10. After lower the lid 14, the gripper attachment 26 may release from the edge 32 to release the lid 14 on top of the kiln 10, as shown in FIG. 10.

Figure 11:
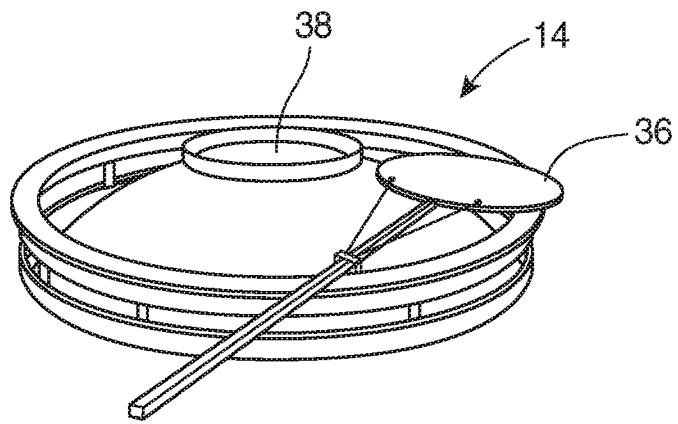
FIGS. 11-12 illustrate covering an opening in the lid for a stack assembly.
Figure 12:
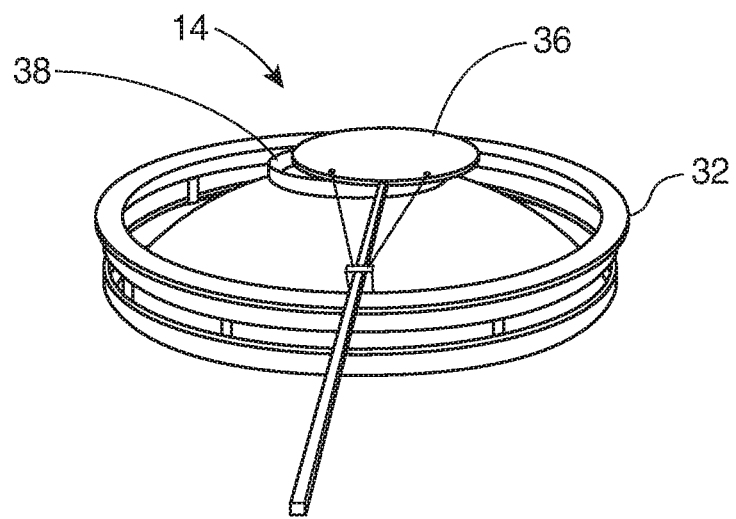
Figure 18:
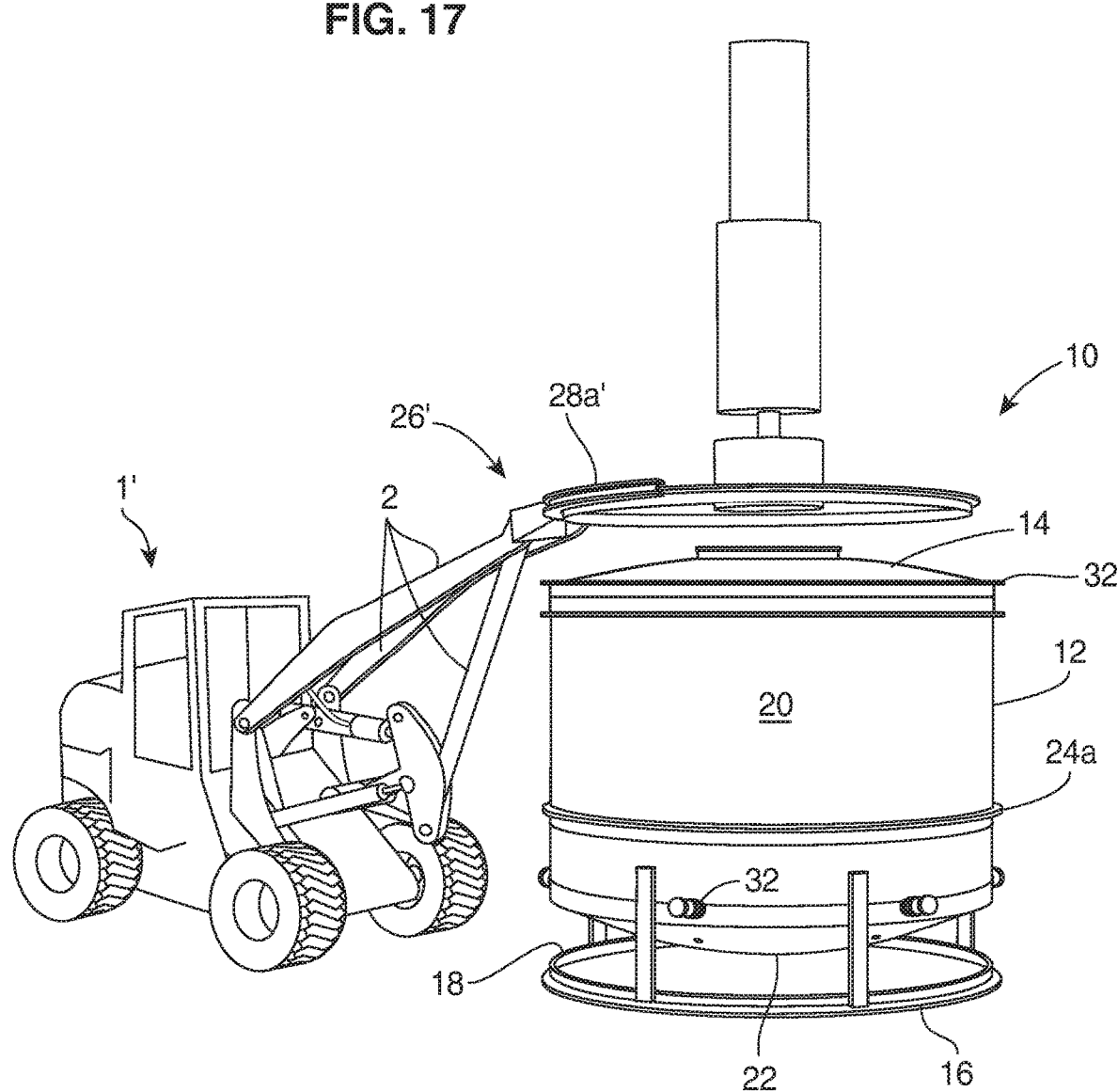
FIG. 18 illustrates assembling the lid and stack assembly on the portable biochar kiln.

FIGS. 11-12 illustrate covering an opening 38 in the lid 14 for a stack assembly (see, e.g., stack 15 in FIGS. 1 and 18). When the burn is complete, the stack 15 is removed from the lid 14 and a gasket cover 36 is positioned to seal the opening 38 in the kiln lid 14. With the stack opening 38 and the bottom vent pipes sealed, the biochar embers self-extinguish due to lack of oxygen. The cover 36 may be positioned manually by an operator, or using the gripper attachment 26 or other machinery.

It is noted that a lighter duty gripper (or "mini-gripper") may be provided for low weight applications, such as lid and stack removal. FIGS. 13-17 illustrate transporting the lid 14 of the example portable biochar kiln 10. FIG. 18 illustrates assembling the lid 14 and stack assembly 15 on the portable biochar kiln 10.

The mini-gripper 26' permits use of smaller-weight machinery (e.g., front-end loader 1') which can result in cost savings (e.g., 60% to 70% over the cost of larger loaders 1). In an example, the mini-gripper 26' can be readily mounted to smaller machinery such as skid-steer-type of equipment.

Figure 13:
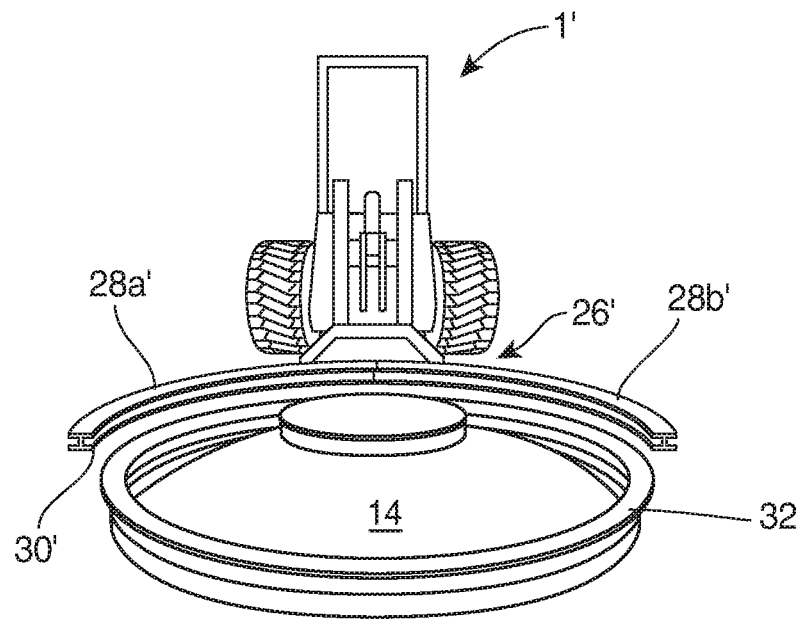
FIGS. 13-17 illustrate transporting the lid of the example portable biochar kiln.
Figure 14:
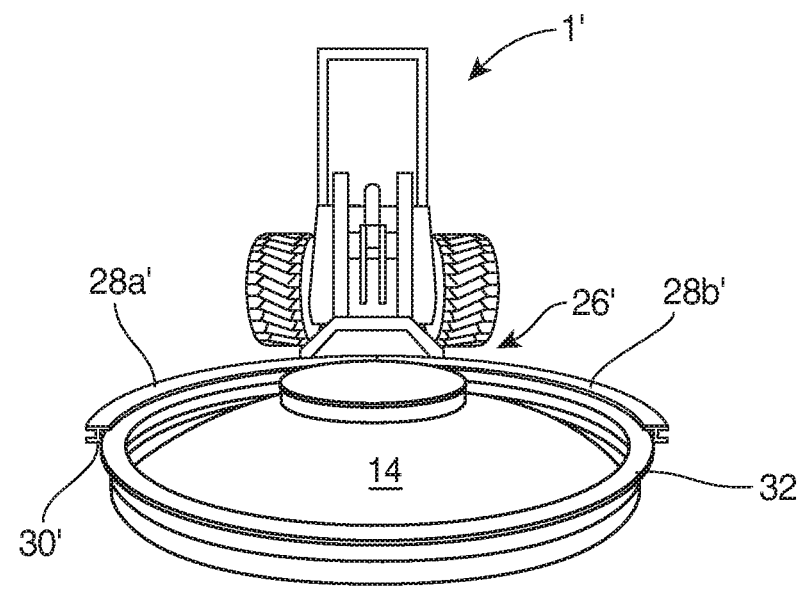

In FIG. 13, the front-end loader 1' is shown as it may approach the lid 14 (e.g., in this case the lid 14 is laying on the ground). The gripper attachment 26' may be at about the same height as the edge 32 of the lid 14. As the front-end loader moves toward the lid 14, a channel 30' formed in each of the arms 28a'-b' of the gripper attachment 26' may be slid onto the edge 32.

Figure 15:
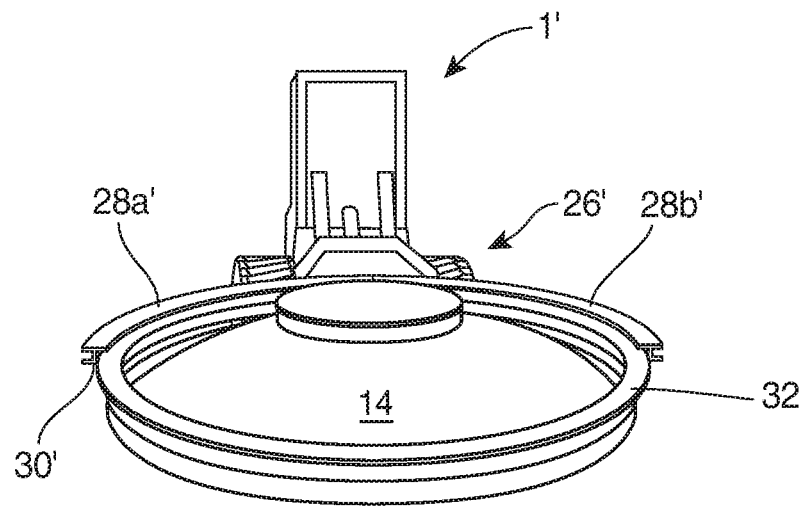
Figure 16:
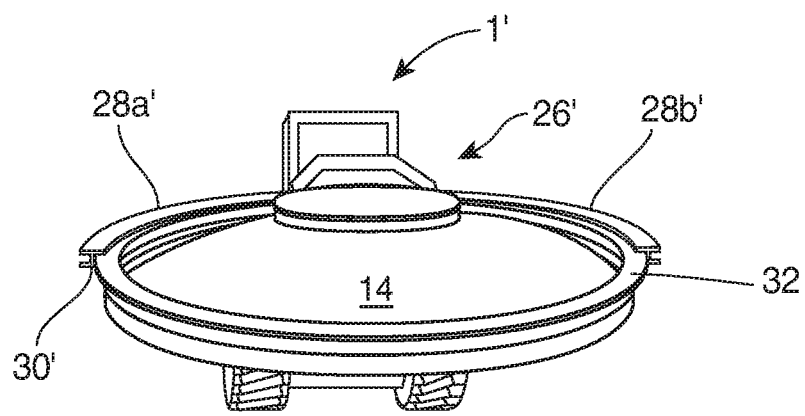
Figure 17:
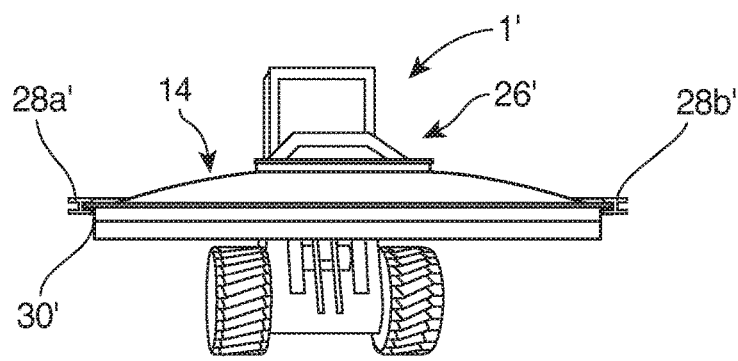

After positioning at the desired location, the arms 28a'-b' of the gripper attachment 26' may be closed against the edge 32 to secure the lid 14 within the gripper attachment 26'. After engaging the arms 28a'-b' with the edge 32, the arms of the front-end loader 1' may be raised, as shown in FIGS. 15-16. As such, the front-end loader 1 may be used to transport the lid 14 (as shown in FIG. 17) to any desired location, such as to a kiln 10 shown in FIG. 18.

The gripper 26' may also be operated as shown in FIG. 18 to add the stack 15 on top of the lid 14. The gripper 26' may engage a ring 40 of the stack 15. Operation to engage ring 40 is similar to that already described for engaging edge 32 of the lid 14. In an example, the stack 15 may be assembled prior to positioning the lid 14 onto the kiln 10. In another example, the stack 15 may be assembled after positioning the lid 14 onto the kiln 10.

The mini-gripper 42 also can be manufactured with less material, has a simplified arm actuator, and may have a limited rotor (e.g., for leveling only). Again, the mini-gripper 40 may include an industry-standard attachment.

It is noted that the examples shown and described are provided for purposes of illustration and are not intended to be limiting. Still other examples are also contemplated.

The invention claimed is:

1. A lid assembly for a portable biochar kiln, the lid assembly comprising:
   a cylindrical sidewall;
   a substantially L-shaped rim attached around the cylindrical sidewall by a plurality of spacers, the rim having an outer diameter larger than an outer diameter of the cylindrical sidewall;
   a top portion having an opening formed therein;
   a removable stack configured to fit over the opening formed in the top portion to direct exhaust from the portable biochar kiln; and
   a gasket cover interchangeable with the removable stack to fit over the opening formed in the top portion.

2. The lid assembly of claim 1, wherein the stack is removed from the top portion and the gasket cover is positioned to seal the opening formed therein when a burn is complete in the portable biochar kiln.

3. The lid assembly of claim 2, wherein the gasket cover forms a substantially airtight seal over the opening formed in the top portion.

4. The lid assembly of claim 3, wherein embers in the portable biochar kiln self-extinguish after positioning the gasket cover.

5. The lid assembly of claim 1, further comprising an elongated handle portion of the gasket cover.

6. The lid assembly of claim 5, wherein the handle portion of the gasket cover is manually positioned on the opening formed in the top portion.

7. The lid assembly of claim 5, wherein the handle portion of the gasket cover is positioned by machinery on the opening formed in the top portion.

8. The lid assembly of claim 5, further comprising a mount for the handle portion, the mount attached to the rim.

9. The lid assembly of claim 5, wherein the handle portion moves from side to side in a mount to cover and uncover or partially uncover the opening formed in the top portion.

10. The lid assembly of claim 5, further comprising a first support member connected on a first end of the first support member to the cover and on a second end of the first support member to the handle portion.

11. The lid assembly of claim 10, further comprising a second support member connected on a first end of the second support member to the cover and on a second end of the second support member to the handle portion.

12. The lid assembly of claim 1, wherein the removable stack has a base portion, a mid portion, and a top portion.

13. The lid assembly of claim 1, wherein the removable stack has an interior column supporting the base portion, the mid portion, and top portion.

14. The lid assembly of claim 1, wherein the rim is offset from the cylindrical sidewall.

15. The lid assembly of claim 1, wherein the rim has a top portion with a width that is greater than a rim height and the cylindrical sidewall has a width that is less than a sidewall height.

16. The lid assembly of claim 1, wherein the stack is assembled prior to positioning the lid assembly onto the portable biochar kiln.

17. The lid assembly of claim 1, wherein the stack is assembled after positioning the lid assembly onto the portable biochar kiln.

18. A lid assembly for a portable biochar kiln, comprising:
a cylindrical sidewall;
a substantially L-shaped rim attached in spaced apart relation to the cylindrical sidewall by a plurality of spacers, the rim having an outer diameter larger than an outer diameter of the cylindrical sidewall;
a top portion having an opening formed therein;
a removable stack configured to fit over the opening formed in the top portion to direct exhaust from the portable biochar kiln, the removable stack has a base portion, a mid portion, and a top portion;
a gasket cover interchangeable with the removable stack to fit over the opening formed in the top portion to form a substantially airtight seal over the opening formed in the top portion when a burn is complete in the portable biochar kiln to self-extinguish embers in the portable biochar kiln;
a handle portion of the gasket cover; and
a mount for the handle portion, the mount attached to the rim.

\* \* \* \* \*